Aug. 13, 1935.  C. P. POTTER  2,011,116
SQUIRREL CAGE ROTOR AND METHOD OF MANUFACTURE
Filed June 28, 1934
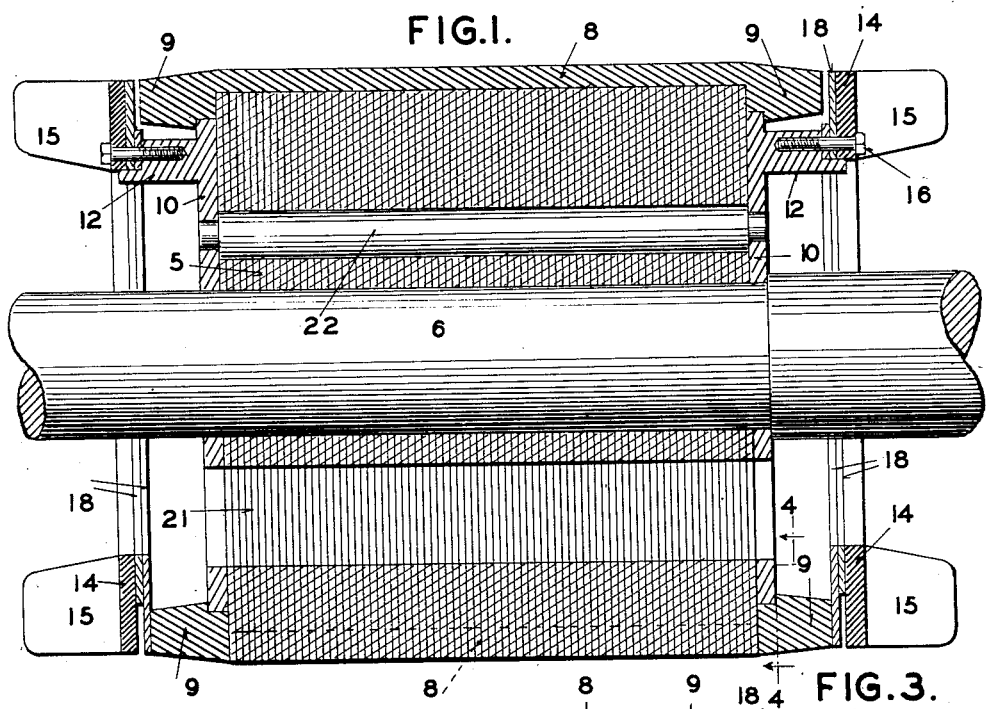
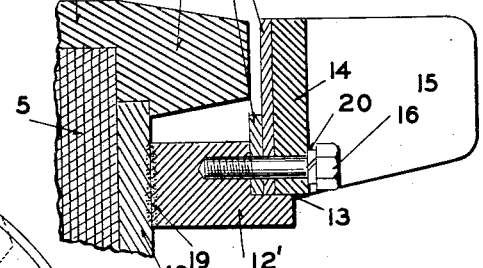
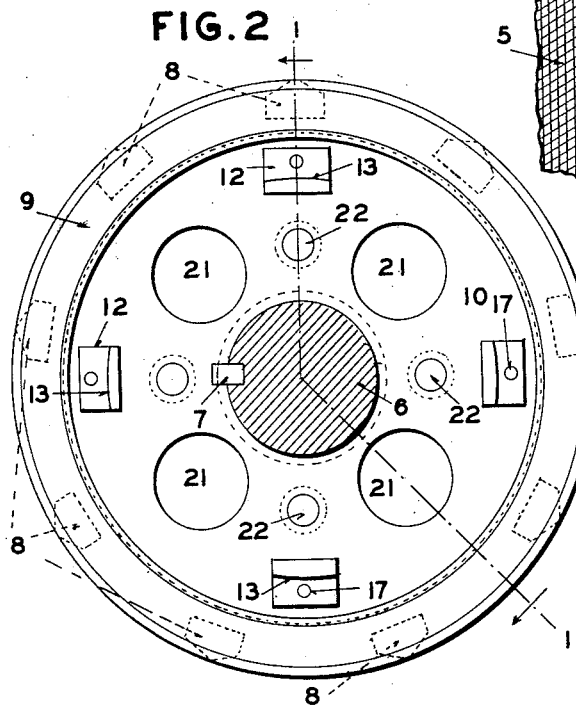
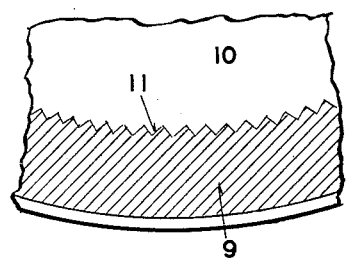
Inventor
Chas. P. Potter
By
Att'y Patented Aug. 13, 1935

2,011,116

UNITED STATES PATENT OFFICE 2,011,116

SQUIRREL CAGE ROTOR AND METHOD OF MANUFACTURE

Charles P. Potter, St. Louis, Mo., assignor to Wagner Electric Corporation, St. Louis, Mo., a corporation of Delaware Application June 28, 1934, Serial No. 732,787

6 Claims. (Cl. 172—120)

My invention relates to a squirrel cage rotor such as is used in single-phase and poly-phase induction motors, and particularly to that type of rotor known as a "cast" rotor in which the conducting bars and the end rings connecting them are cast integral, these parts, together with the laminæ, constituting the magnetic field of the rotor forming a substantially unitary structure.

Rotors of the squirrel cage type are usually provided with blowers to circulate air around both the rotor and the stator windings for the purpose of cooling the machine. Heretofore difficulty has been encountered in securing such blowers to squirrel cage rotors of the cast type in a manner which is simple and inexpensive and, at the same time, effective in preventing the shaking loose of the blowers during the operation of the motor.

The principal object of my invention is to provide simple and effective means for securing blowers to squirrel cage rotors of the cast type.

In the accompanying drawing, which illustrates a cast squirrel cage rotor made in accordance with my invention, Figure 1 is a longitudinal section taken on the line 1—1 of Figure 2; Figure 2 is an end view, the blower ring being omitted; Figure 3 is an enlarged fragmentary section showing a modification; and Figure 4 is an enlarged section taken on the line 4—4 of Figure 1, also showing a modification.

Referring first to Figures 1 and 2, the numeral 5 indicates laminæ of iron or other magnetic material mounted on a rotor shaft 6 and forming the field core of the rotor. The rotor may be secured against rotation on the shaft by means of a key 7 or in any other desired manner. The rotor core is provided with the usual peripheral slots to receive the squirrel cage bars 8 which are cast integral with end rings 9. These end rings are of sufficient width to extend inwardly an appreciable distance beyond the inner sides of the bars 8. The end plates 10 are of a diameter somewhat greater than the inside diameters of the rings 9. These end plates are clamped against the laminæ while the bars and end rings are cast so that their peripheries are imbedded in the rings. The longitudinal contraction of the bars 8 upon cooling, firmly clamps the end plates against the laminæ while the diametrical shrinkage of the rings causes the rings to firmly grip the edges of the plates in order to prevent any possible radial movement of the parts. The peripheries of the plates may be smooth or may be provided with teeth 11 (Figure 4) or other forms of projections to provide more rigid connections between the plates and the rings.

Formed integral with the end plates are lugs 12 projecting slightly beyond the outer ends of the rings 9. After the parts are assembled a portion of the outer faces of the lugs is turned off to provide arcuate bearing faces 13 concentric with the axis of the rotor shaft. Seated on these bearing faces are blower rings 14, each provided with any desired number of fan blades 15. The blower rings are held in position by bolts 16 entering threaded openings 17 in the reduced ends of the lugs. The blower rings may be clamped directly against the reduced portions of the lugs or against balancing rings 18 interposed between the inner faces of the rings and the ends of the lugs. These balancing rings may be of any desired type such, for example, as that shown in application of Messrs. W. J. Newman and F. W. Munson, Serial No. 662,034, filed March 22, 1933.

In Figure 3 I have shown a slight modification in which the integral lugs 12 are replaced by lugs 12' formed separately from the end plates and secured thereto by welded or brazed joints 19. This figure also shows the use of a lock washer 20 on the bolt 16 as a precaution against loosening through vibration.

The rotor is preferably provided with longitudinal air passages 21 and may also be provided with tie rods 22 for holding the laminæ in alignment.

Having fully described my invention, what I claim as new and desire to secure by Letters Patent of the United States is:

1. In a squirrel cage rotor having its end rings integral with its conductor bars, an end plate having peripheral contact with the inner face of one of the rings, lugs carried on said end plate, said lugs being provided with arcuate bearing faces concentric with the axis of the rotor, and a blower ring mounted on said bearing faces.

2. In a squirrel cage rotor having its end rings integral with its conductor bars, an end plate having peripheral contact with the inner face of one of the rings, lugs carried on said end plate, said lugs being provided with arcuate bearing faces concentric with the axis of the rotor, a blower ring mounted on said bearing faces, and balancing rings mounted on said bearing faces at the inner side of the blower ring.

3. The method of forming a squirrel cage rotor which comprises assembling a number of laminæ of magnetic material to provide a core having peripheral slots, placing an end plate of less diameter than the core against one end thereof, and applying a squirrel cage winding to the assembly by casting integral conducting bars and end rings, the periphery of the end plate being imbedded in one of the end rings.

4. The method of forming a squirrel cage rotor which comprises assembling a number of laminæ of magnetic material to provide a core having peripheral slots, placing an end plate of less diameter than the core against one end thereof, said plate carrying lugs, applying a squirrel cage winding by casting integral conducting bars and end rings, the periphery of the plate being embedded in one of the end rings, and machining said lugs to form arcuate bearing faces concentric with the axis of the rotor.

5. In a squirrel cage rotor having its rings integral with its conductor bars, an end plate having peripheral contact with the inner face of one of the rings, lugs carried on said end plate, a blower ring mounted on said lugs, and fan blades carried by said blower ring.

6. In a squirrel cage rotor having its rings integral with its conductor bars, an end plate having peripheral projections, said projections entering one of the rings to prevent relative rotation between the plate and the ring, and a blower secured to said plate.

CHARLES P. POTTER.